(12) United States Patent
Harring, III (10) Patent No.: US 12,165,524 B2
(45) Date of Patent: Dec. 10, 2024

(54) AIRCRAFT GUIDANCE WITH A MULTI-VEHICLE NETWORK

(71) Applicant: Insitu, Inc., Bingen, WA (US)

(72) Inventor: Donald Calvin Harring, III, Hood River, OR (US)

(73) Assignee: INSITU, INC., Bingen, WA (US)

(*) Notice: Subject to any disclaimer, the term of this patent is extended or adjusted under 35 U.S.C. 154(b) by 207 days.

(21) Appl. No.: 17/375,842

(22) Filed: Jul. 14, 2021

(65) Prior Publication Data

US 2022/0051572 A1 Feb. 17, 2022

Related U.S. Application Data

(60) Provisional application No. 63/064,603, filed on Aug. 12, 2020.

(51) Int. Cl.
*G08G 5/00* (2006.01)
*G01S 19/24* (2010.01)
*G05D 1/00* (2024.01)
*H04B 17/318* (2015.01)

(52) U.S. Cl.
CPC ............ *G08G 5/0021* (2013.01); *G01S 19/24* (2013.01); *G05D 1/101* (2013.01); *G08G 5/0008* (2013.01); *G08G 5/0069* (2013.01); *H04B 17/318* (2015.01)

(58) Field of Classification Search
CPC .... G05D 1/101; G08G 5/0008; G08G 5/0021; G08G 5/0069; H04B 17/318; G01S 19/24
See application file for complete search history.

(56) References Cited

U.S. PATENT DOCUMENTS

| 11,009,867 | B1* | 5/2021 | West | G05D 1/0027 |
| 2019/0056512 | A1* | 2/2019 | Onomura | G01S 19/47 |
| 2020/0005656 | A1* | 1/2020 | Saunamaeki | G05D 1/0027 |
| 2021/0150917 | A1* | 5/2021 | Kubie | G08G 5/0039 |

FOREIGN PATENT DOCUMENTS

| CN | 107 976 690 A | 5/2018 |
| WO | 2008027056 A1 | 3/2008 |
| WO | 2018112823 A1 | 6/2018 |

OTHER PUBLICATIONS

European Patent Office, Extended European Search Report, issued in connection with Application No. 21190360.4, dated Feb. 3, 2022, 8 pages.
European Patent Office, "Communication Pursuant to Article 94(3) EPC," issued in connection with European Application No. 21 190 360.4, Dec. 4, 2023, 5 pages.

* cited by examiner

*Primary Examiner* — Jason Holloway
*Assistant Examiner* — Christopher A Buksa
(74) *Attorney, Agent, or Firm* — Hanley, Flight & Zimmerman, LLC (57) ABSTRACT

Aircraft guidance with a multi-vehicle network is disclosed. A disclosed example apparatus to determine a position of an aircraft in a contested area includes a direction and distance calculator to determine a relative position of the aircraft to a mobile platform based on a signal transmitted between the aircraft and the mobile platform. The apparatus further includes a position calculator to calculate the position of the aircraft based on the relative position and a position of the mobile platform.

24 Claims, 9 Drawing Sheets

FIG. 7

AIRCRAFT GUIDANCE WITH A MULTI-VEHICLE NETWORK

RELATED APPLICATION

This patent claims the benefit of U.S. Provisional Patent Application No. 63/064,603, which was filed on Aug. 12, 2020. U.S. Patent Application Ser. No. 63/064,603 is hereby incorporated herein by reference in its entirety. Priority to U.S. Patent Application Ser. No. 63/064,603 is hereby claimed.

FIELD OF THE DISCLOSURE

This disclosure relates generally to aircraft and, more particularly, to aircraft guidance with a multi-vehicle network.

BACKGROUND

Typically, aircraft, such as unmanned aerial vehicles (UAVs), rely on external global positioning system (GPS) signals for guidance and navigation. However, in some locations or areas, the GPS signals can sometimes be obscured and/or exhibit a relatively low signal strength. In other words, the GPS signals can be contested. Accordingly, some known guidance systems of aircraft employ differential systems that estimate a positional change based on a known previous position. However, these known guidance systems can be subject to inaccuracies.

SUMMARY

An apparatus to determine a position of an aircraft in a contested area includes a direction and distance calculator to determine a relative position of the aircraft to a mobile platform based on a signal transmitted between the aircraft and the mobile platform. The apparatus further includes a position calculator to calculate the position of the aircraft based on the relative position and a position of the mobile platform.

An aircraft coordination system for coordinating navigation of at least one aircraft of a multi-vehicle network in a contested area includes a signal direction and distance calculator to determine a relative position of the at least one aircraft to a mobile platform based on a signal transmitted between the at least one aircraft and the mobile platform, a position calculator to calculate a position of the at least one aircraft based on the relative position and a position of the mobile platform, and a flight director to direct movement of the at least one aircraft based on the position of the at least one aircraft.

An example method includes calculating, by executing instructions with at least one processor, a relative position between an aircraft and a mobile platform based on a signal transmitted between the aircraft and the mobile platform, and calculating, by executing instructions with the at least one processor, a position of the aircraft based on the relative position and a position of the mobile platform.

A non-transitory machine readable medium includes instructions, which when executed cause a processor to at least calculate a relative position between an aircraft and a mobile platform based on a signal transmitted between the aircraft and the mobile platform, and calculate a position of the aircraft based on the relative position and a position of the mobile platform.

The figures are not to scale. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Aircraft guidance with a multi-vehicle network is disclosed. Some areas can have relatively weak global position system (GPS) signals due to weather conditions, obstructions, etc. Further, the GPS signals can be jammed or spoofed. When flying through these contested areas, some known guidance systems of aircraft employ differential systems that estimate a positional change based on a known previous position. However, inaccuracies of these systems can be more significant as a distance from the known previous position increases or as time increases (e.g., due to known previous positions evolving or drift associated with Micro-Electro Mechanical Systems (MEMS) based inertial measurement units). Further, hardware on aircraft relating to processing and/or analysis of GPS signals can fail or malfunction.

Examples disclosed herein enable accurate navigation of an aircraft, such as an unmanned aerial vehicle (UAV), in contested areas with relatively weak or compromised GPS signals by enabling a determination of a position of the aircraft in the absence of valid GPS signals. Further, examples disclosed herein can mitigate a failure corresponding to GPS signal processing and/or GPS signals. Examples disclosed herein utilize at least one mobile platform, which can be implemented as an aircraft or other type of vehicle, to guide movement and/or facilitate guidance of the aircraft. A signal and direction calculator is used to determine a relative position (e.g., a relative position based on three dimensions) between the aircraft and the mobile platform based on a signal transmitted between the aircraft and the mobile platform. A position calculator calculates the position of the aircraft based on the relative position and a known (e.g., measured) position of the mobile platform.

In some examples, a determination of whether the aircraft is in an area with weak, spoofed or compromised GPS signals (i.e., a contested area) is performed via a GPS signal analyzer. In some such examples, the aircraft is toggled to disregard or ignore the GPS signals based on the determination. In some examples, the aircraft and the mobile platform are implemented as UAVs (e.g., identical or similar unmanned aircraft types). In some examples, the relative position is based on direction finding in which a multi-directional antenna and/or direction finding antenna array is utilized in combination with a time-of-flight signal. In some examples, the relative position includes a three-dimensional spatial vector that may be determined based on measuring signal strengths between the aircraft and the mobile platform. Such implementations can utilize at least three sensors (e.g., antennas) on each aircraft to determine spatial information therebetween. In some examples, the mobile platform is a spacecraft (e.g., a satellite) or ground-based vehicle.

In some examples, the aircraft and the mobile platform at least partially define an airborne network (e.g., an airborne guidance network). The airborne network can be implemented across multiple vehicles, for example. In some examples, the movement of the mobile platform is coordinated, via the airborne network, to ensure that the aircraft can be guided through an area with compromised or relatively low signal strength GPS signal areas. Particularly, the mobile platform can be moved closer to the aircraft so that a transmitted signal can be accurately measured therebetween.

As used herein, the term "mobile platform" refers to a moving platform, such as a vehicle, that can be moved and/or propelled in relationship to another vehicle. Accordingly, the term "mobile platform" can refer to an aircraft, a ground-based vehicle, a watercraft, a spacecraft, a submersible, etc. As used herein, the term "relative position" refers to a positional difference (e.g., a vector positional difference) between two objects.

Figure 1:
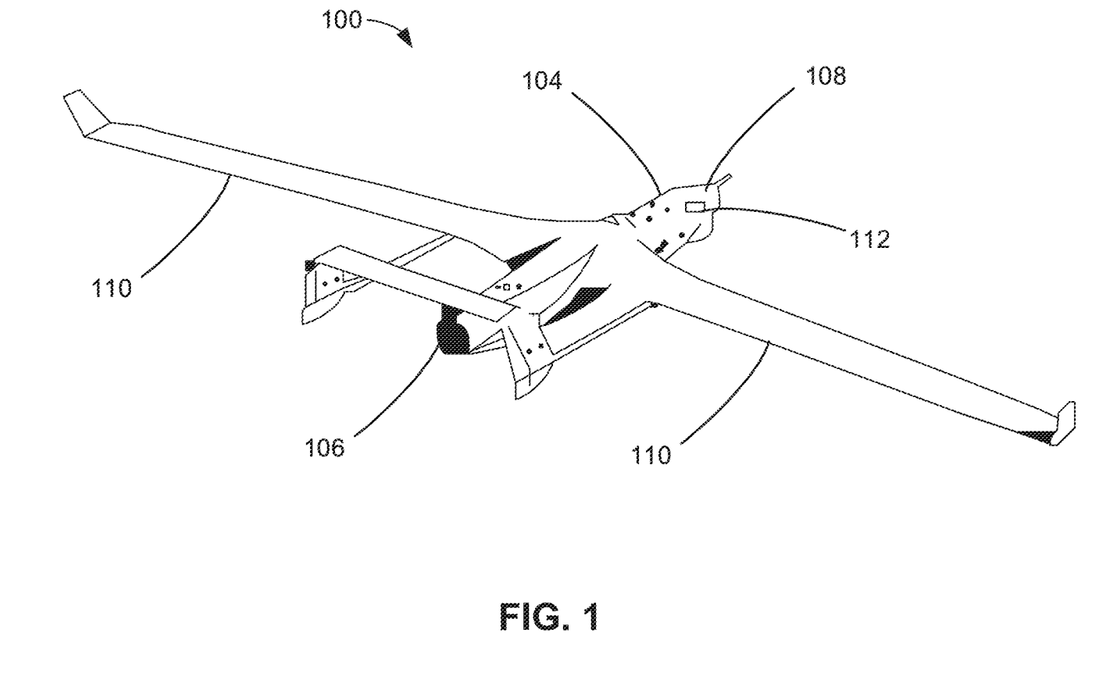
FIG. 1 illustrates an example vehicle in which examples disclosed herein can be implemented.

FIG. 1 illustrates an example aircraft (e.g., an aerial vehicle) 100 in which examples disclosed herein can be implemented. The aircraft 100 includes a fuselage 104, a propulsion system 106, a control system (e.g., a guidance system) 108, wings 110 and an antenna 112 (e.g., a direction finding antenna array, a radio direction finder (RDF), etc.). In the illustrated example of FIG. 1, the aircraft 100 is an unmanned aerial vehicle (UAV). In other examples, however, the aircraft 100 may be a manned vehicle. In various examples, the aircraft 100 may be piloted by a human or may be an autonomous vehicle with passengers, cargo or other payload. In yet other examples, a rotorcraft (e.g., a quadcopter) can be implemented instead.

In operation, the aircraft 100 is directed and/or navigated based on GPS signals received at the aircraft 100. In particular, the GPS signals are utilized by the control system 108 to direct movement of the aircraft 100. For example, the control system 108 can be controlled and/or directed by a remote command center (e.g., a ground-based command center) based on the aforementioned GPS signals. However, the GPS signals measured at the aircraft 100 can have a relatively low signal strength in certain areas or be jammed. Accordingly, in such scenarios, examples disclosed herein can be effective for providing positional data (e.g., geolocation data) to the aircraft 100 and/or to guide movement of the aircraft 100 in locations (e.g., zones, areas, etc.) in which the GPS signals are weak or compromised (e.g., jammed, spoofed, etc.). Further, examples, disclosed can be mitigate any GPS failures.

Figure 2:
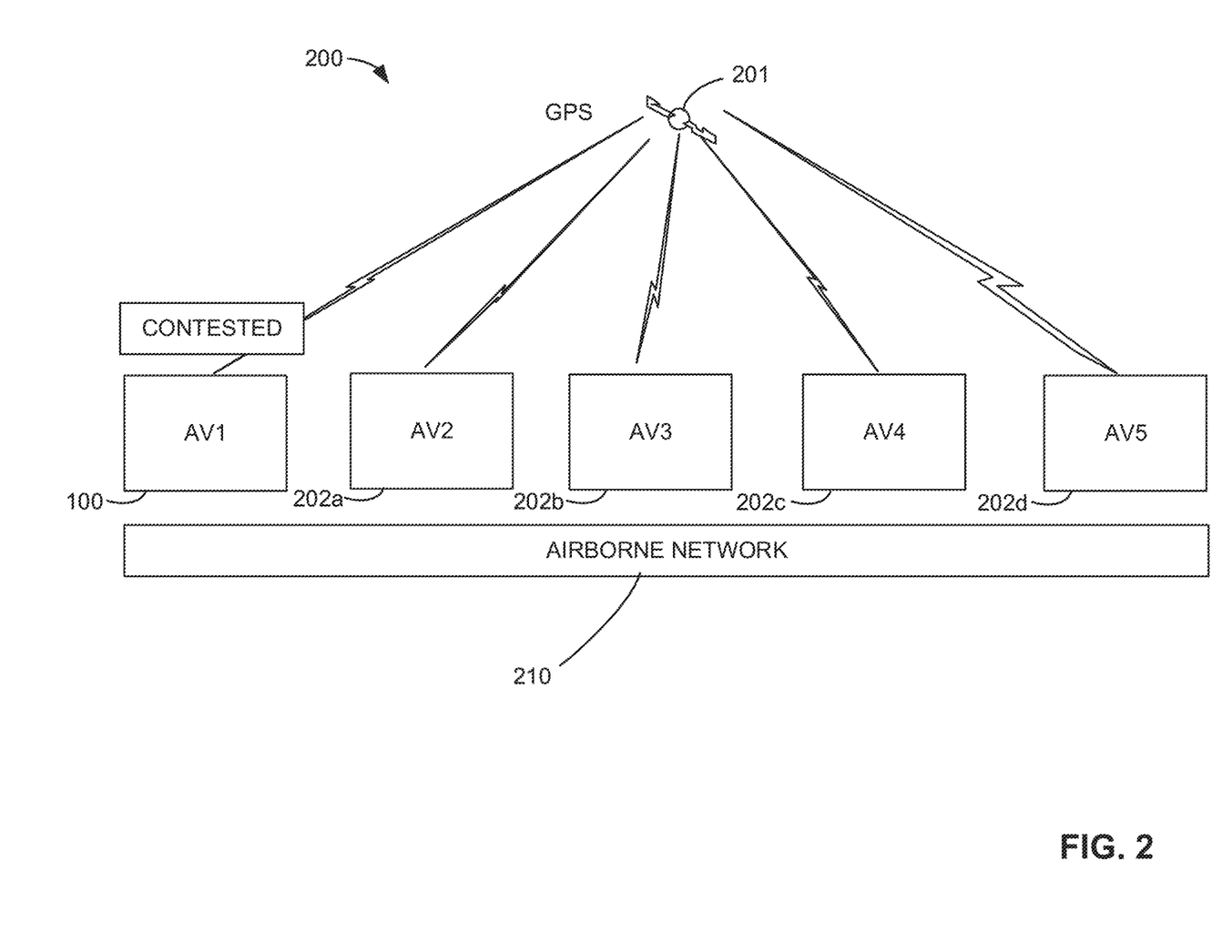
FIG. 2 illustrates an example multi-vehicle network in accordance with teachings of this disclosure.

FIG. 2 illustrates an example multi-vehicle network 200 in accordance with teachings of this disclosure. In the illustrated example, a GPS source 201, such as a satellite or system of satellites in a global navigation satellite system (GNSS), for example, is shown in combination with the aircraft 100 and mobile platforms 202 (hereinafter mobile platforms 202a, 202b, 202c, 202d, etc.), which are implemented as aircraft in this example. Further, an airborne network 210 is shown. The airborne network 210 can be implemented on the aircraft 100 and/or the mobile platforms 202a, 202b, 202c, 202d. Particularly, the example airborne network 210 may be implemented across multiple aircraft and/or structures. Additionally or alternatively, at least a portion of the airborne network 210 is implemented at a transceiver station (e.g., a land-based transceiver station, a water-based transceiver station, a spaced-based transceiver station, etc.).

To direct movement of the aircraft 100 when the aircraft 100 is receiving valid and sufficiently strong GPS signals from the GPS source 201, the guidance system 108 utilizes the GPS signals to direct movement of the aircraft 100 and/or the propulsion system 106 based on a pre-determined or directed flight path of the aircraft 100. However, the aircraft 100 can encounter and/or be moved into areas in which the GPS signals are weak or compromised. Further, systems that process the GPS signals can fail and/or malfunction.

When the GPS signal received at the aircraft 100 is contested, weak and/or compromised, the airborne network 210 determines a position of the aircraft 100 to maintain guidance thereof. In this example, a position (e.g., a known GPS position) of at least one of the mobile platforms 202a, 202b, 202c, 202d is determined and/or measured. Further, a relative position between the aircraft 100 and the at least one of the mobile platforms 202a, 202b, 202c, 202d is determined. In turn, a position of the aircraft 100 is determined based on the position of the at least one of the mobile platforms 202a, 202b, 202c, 202d and the relative position of the aircraft 100 to the at least one of the mobile platforms 202a, 202b, 202c, 202d. In some examples, the aircraft 100 determines its position. Additionally or alternatively, the at least one of the mobile platforms 202a, 202b, 202c, 202d determines the position of the aircraft 100.

In some examples, ones of the mobile platforms 202a, 202b, 202c, 202d are aircraft identical to the aircraft 100. In some examples, the airborne network 210 includes only two aircraft. In some such examples, each one of the aircraft of the network 210 acts as a redundant guidance source for the other when GPS signals are not of requisite signal strength or validity. In some examples, the aircraft 100 is one of the mobile platforms 202a, 202b, 202c, 202d. In other words, the designation between aircraft and mobile platform can be arbitrary, in some examples. In some examples, a first one of the mobile platforms 202a, 202b, 202c, 202d guiding or facilitating guidance of the aircraft 100 is different from a second one of the mobile platforms 202a, 202b, 202c, 202d that is used for a relative position determination of the aircraft 100.

While the example of FIG. 2 is shown with multiple aircraft defining the airborne network 210, any appropriate combination of vehicles, manned or unmanned can be implemented instead. While the example of FIG. 2 depicts five aircraft utilizing and/or defining the airborne network 210, any appropriate number (e.g., two, three, four, ten, twenty, fifty, one hundred, etc.) of aircraft and/or mobile platforms can be implemented instead.

Figure 3:
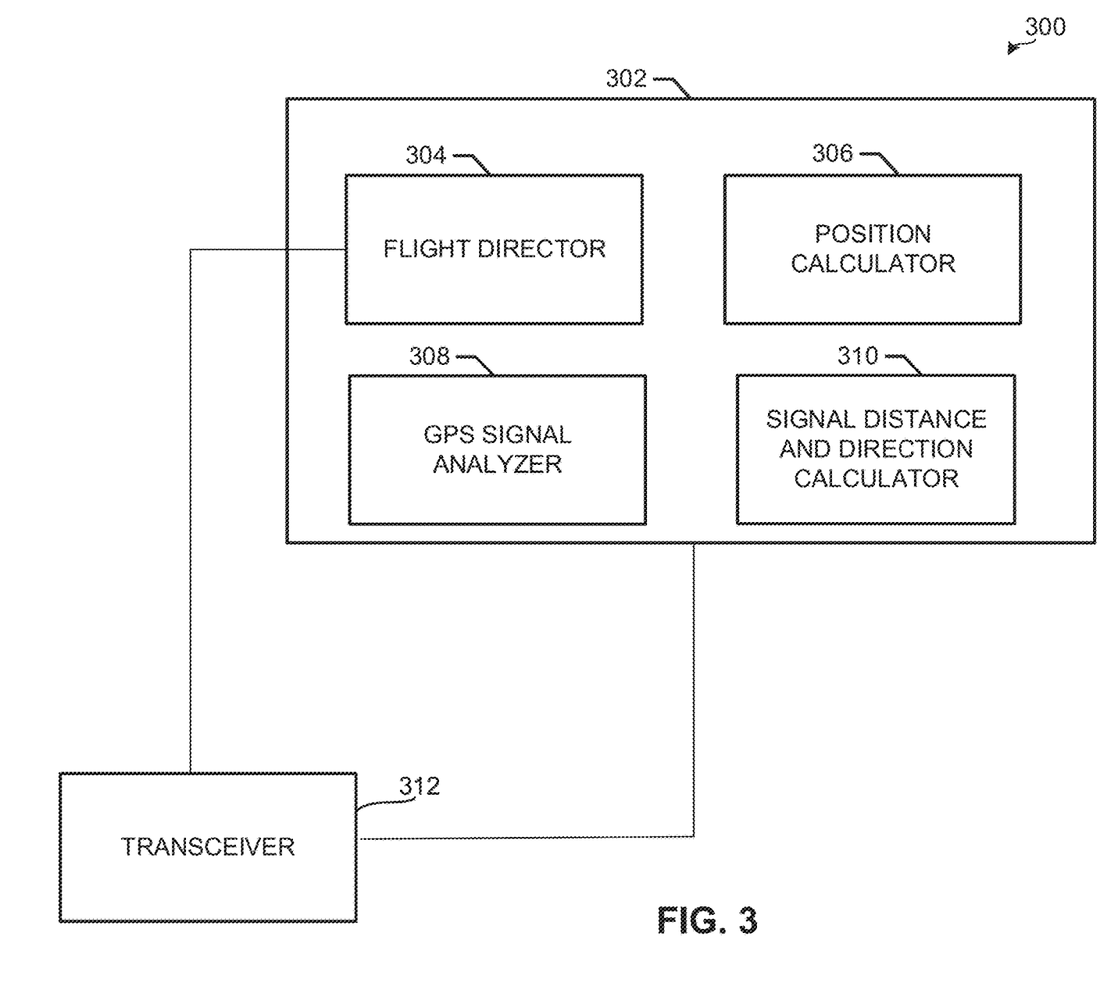
FIG. 3 is a schematic overview of an example flight control system that can be implemented in examples disclosed herein.

FIG. 3 is a schematic of an example flight control system 300 that can be implemented in examples disclosed herein. In particular, the example flight control system 300 can be implemented on the airborne network 210, the aircraft 100 and/or the mobile platform 202. In other examples, the flight control system 300 is implemented external to the airborne network 210, the aircraft 100 and the mobile platform 202 (e.g., at a command center facility or external network). The flight control system 300 of the illustrated example includes a position analyzer 302 which, in turn, includes a flight director 304, a position calculator 306, a GPS signal analyzer 308 and a signal direction and distance calculator 310. In some other examples, however, the GPS signal analyzer 308 is not implemented. In this example, a transceiver 312 is communicatively coupled to the position analyzer 302 and/or the flight director 304.

To guide movement of the aircraft 100 when GPS signals are available and valid, the example flight director 304 utilizes a determined position of the aircraft 100 based on the GPS signals so that the aircraft 100 can be moved along a flight path (e.g., a directed flight path, a pre-determined flight path, etc.). In this example, the flight director 304 can toggle off utilization of the GPS signals based on a determination that the GPS signals received by the aircraft 100 are relatively weak or compromised (e.g., spoofed).

In the illustrated example, to determine a position of the aircraft 100 in a contested area in which GPS signals are compromised and/or exhibit a relatively low signal strength, the signal direction and distance calculator 310 determines a relative position between the aircraft 100 and the mobile platform 202. In particular, a direction finding antenna array (e.g., the antenna 112), which may be implemented on the aircraft 100 and/or the mobile platform 202, in combination with a time-of-flight signal is implemented to determine the relative position.

In some other examples, a measured signal strength (e.g., a measured RF signal strength) between the aircraft 100 and the mobile platform 202 is utilized, as will be discussed in greater detail below in connection with FIG. 5. In such examples, the aircraft 100 and the mobile platform 202 can utilize three transmitter-receiver pairs mounted thereto and, thus, three different signal strength measurements between the aircraft 100 and the mobile platform 202 are obtained. Accordingly, the relative position is determined by the position calculator 306 in multiple degrees of freedom. In other words, positional differences, as well as orientational differences (e.g., yaw, spin, etc.), are determined between the aircraft 100 and the mobile platform 202. However, any appropriate calculation and/or methodology related to calculating relative positions can be implemented instead.

Regardless of how the relative position is calculated, based on the relative position and a known position of the mobile platform 202 (e.g., the mobile platform 202 is positioned in an area in which GPS signals have sufficient signal strength and are valid), the position of the aircraft 100 is calculated by the position calculator 306. This calculation may be performed based on a vector sum of the known position of the platform 202 and the relative position of the aircraft 100 to the mobile platform 202. However, the position of the aircraft 100 can be calculated utilizing any appropriate calculation(s) and/or methodology.

In some examples, to determine whether the GPS signals have sufficient signal strength and are valid, the GPS signal analyzer 308 verifies the GPS signals. For example, the GPS signal analyzer 308 determines that the GPS signals are not spoofed, jammed or corrupt. In some examples, if the GPS signal analyzer 308 successfully verifies the GPS signal, the flight director 304 is provided with the GPS signals and/or enabled to utilize the GPS signals. In some examples, the GPS signal analyzer 308 determines whether the aircraft 100 is located at or proximate an area in which the GPS signals are known or pre-determined to be contested.

In some examples, a speed or velocity of the aircraft 100 is calculated and/or determined by the position calculator 306. In some examples, the position analyzer 302 is implemented on both the aircraft 100 and the mobile platform 202. In particular, the aircraft 100 and the mobile platform 202 can act as redundant navigation sources for one another, for example. In some such examples, one of the aircraft 100 or the mobile platform 202 can receive and utilize valid GPS signals when the other is in a contested GPS area. Additionally or alternatively, the flight director 304 can direct movement of the mobile platform 202 to ensure that the aircraft 100 and the mobile platform 202 are within a desired or requisite communication range such that a relative distance therebetween can be accurately measured and/or that the aircraft 100 and the mobile platform 202 can adequately transmit signals therebetween.

Figure 4A:
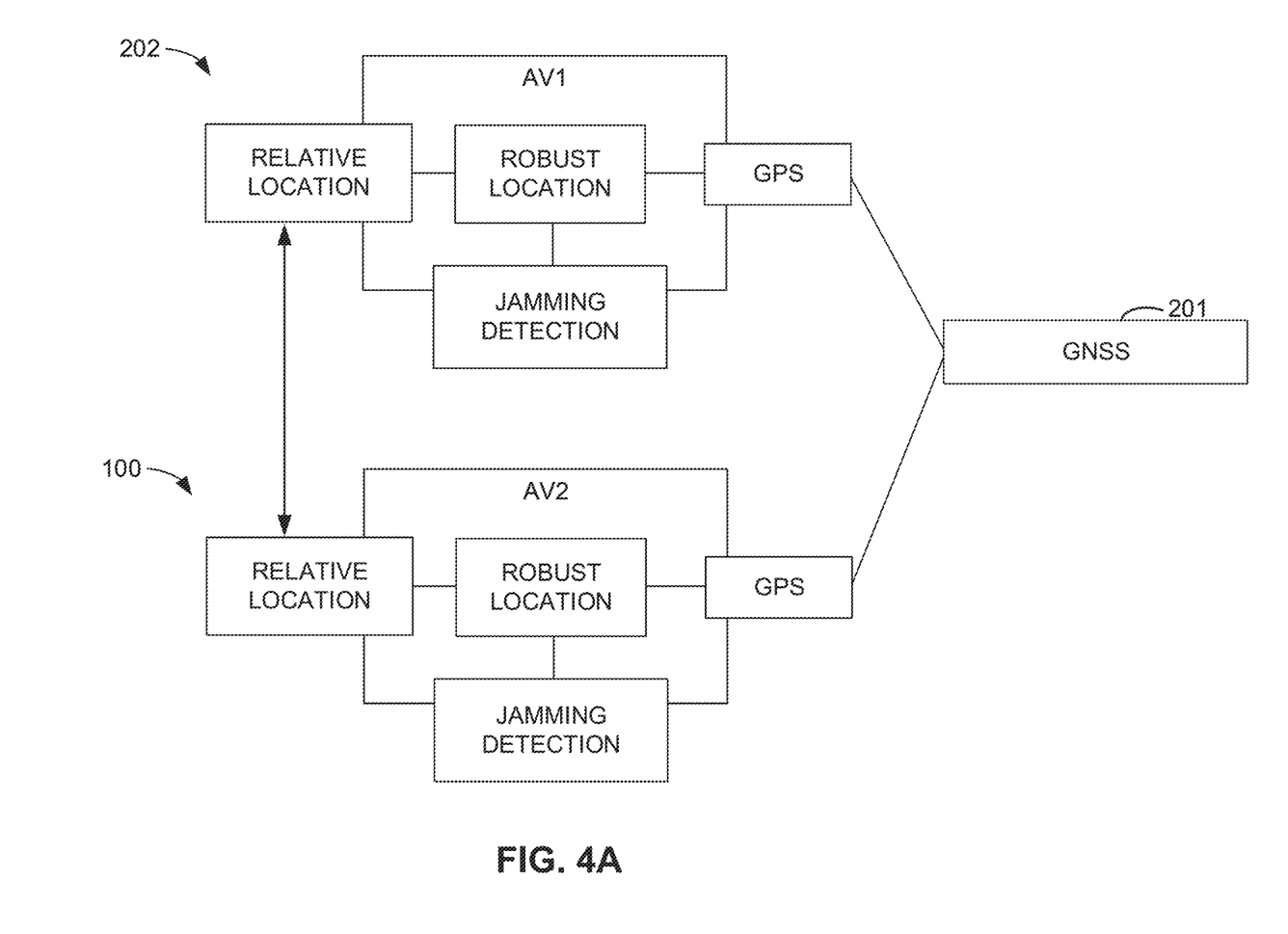
FIGS. 4A-4C depict an example process that can be implemented in examples disclosed herein.
Figure 4B:
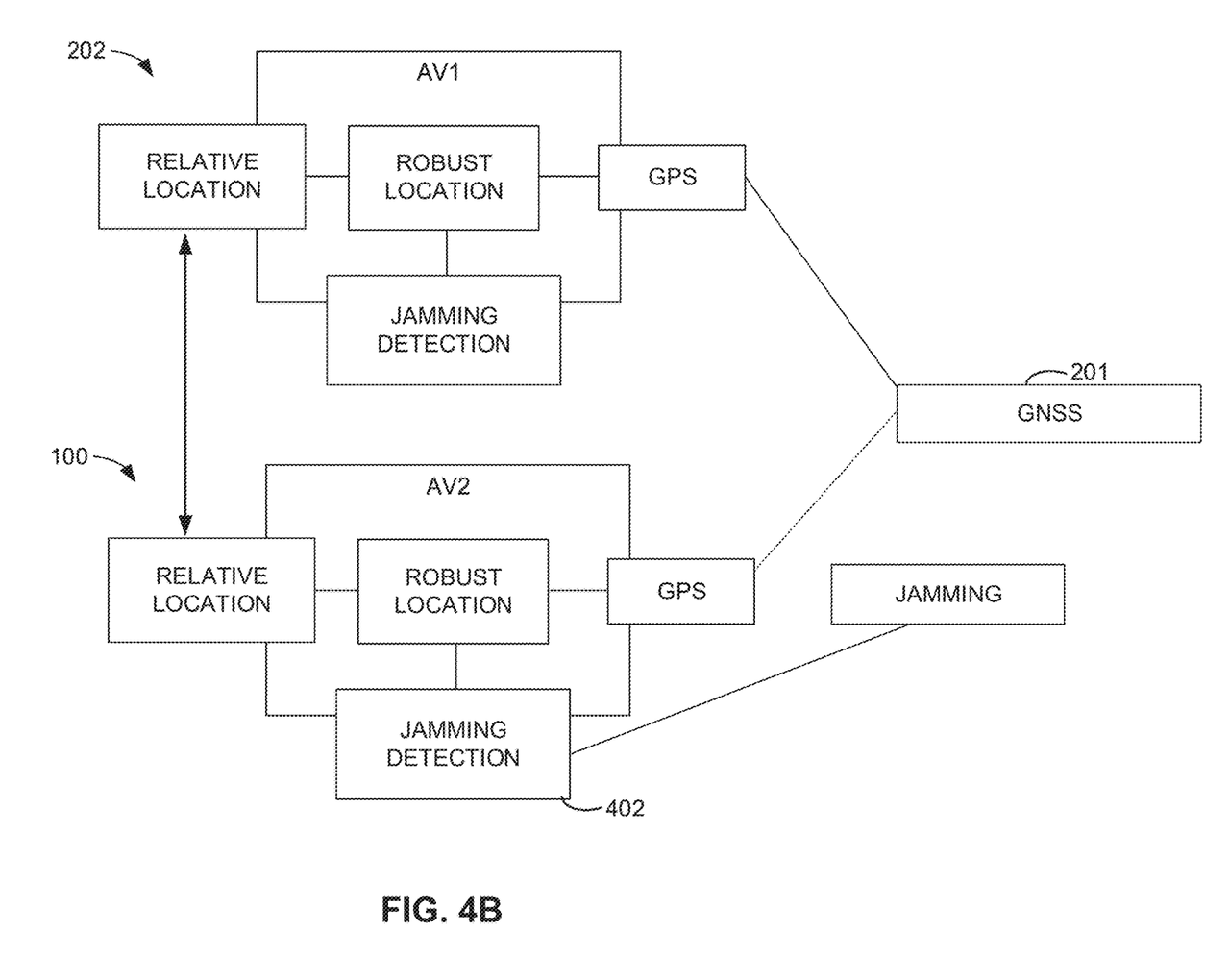
Figure 4C:
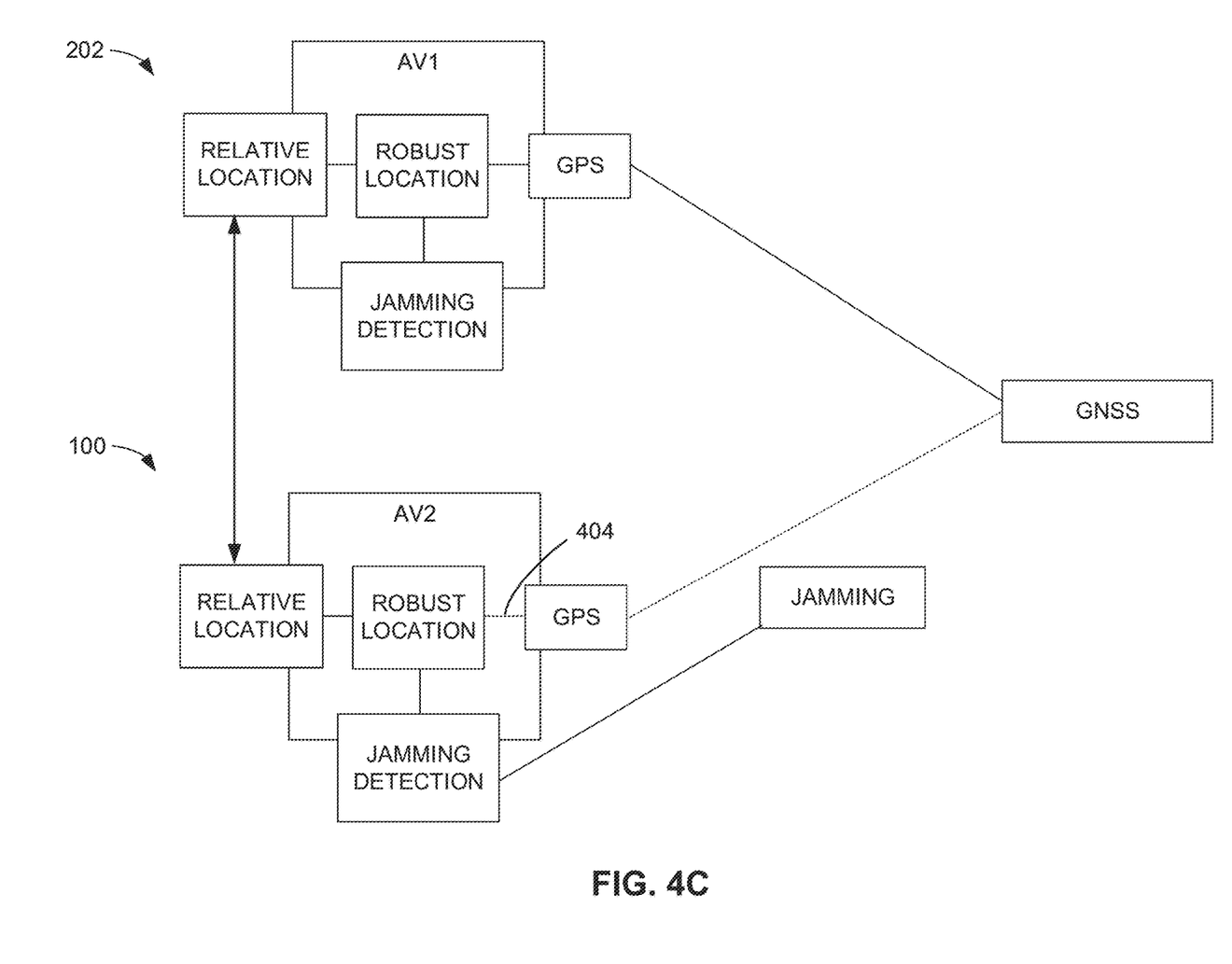

FIGS. 4A-4C depict an example process that can be implemented in examples disclosed herein. In particular example, the aircraft 100 and the mobile platform 202 are generally identical aircraft and, thus, function as redundant navigational guidance for one another. Turning to FIG. 4A, the GPS source 201, the aircraft 100 and the mobile platform 202 are shown in a schematic representation. In the illustrated example, both the aircraft 100 and the mobile platform 202 are receiving GPS signals from the GPS source 201 and determining relative locations therebetween.

FIG. 4B depicts jamming of a GPS signal at or proximate the aircraft 100. In the illustrated example, a jamming detector (e.g., jamming detection hardware, a jamming sensor, etc.) 402 and/or the GPS signal analyzer 308 of FIG. 3 determines that the GPS signal has been jammed. In this example, the aircraft 100 and the mobile platform 202 maintain determination of relative positions to one another.

Turning to FIG. 4C, the aircraft 100 is shown switching to guidance support from the mobile platform 202. As denoted by dotted lines 404, utilization of GPS by the aircraft 100 is toggled off. In other words, the aircraft 100 and/or the flight control system 300 is directed to not utilize the GPS signals. As a result, movement of the aircraft 100 is directed based on the relative position of the aircraft 100 in conjunction with the measured position of the mobile platform 202.

While the mobile platform 202 and the aircraft 100 maintain determination of a relative position therebetween in this example, in some other examples, the relative position determination is only performed when one of the aircraft 100 or the mobile platform 202 is in a contested area.

Figure 5:
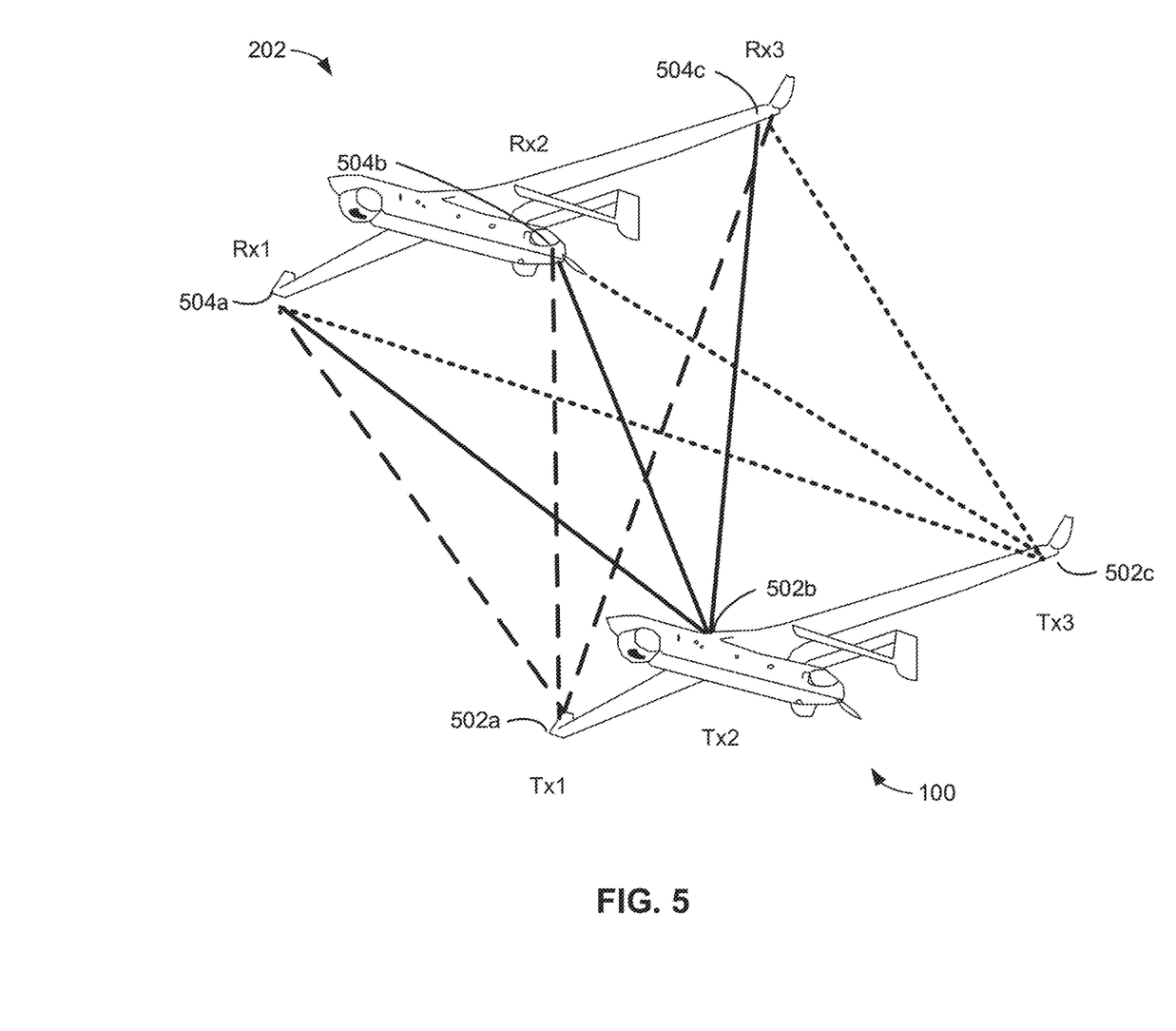
FIG. 5 illustrates an example implementation of a system to determine relative positions that can be implemented in examples disclosed herein.

FIG. 5 illustrates an example implementation of a system to determine relative positions that can be implemented in examples disclosed herein. In particular, an airborne transmitter/receiver array system is implemented to determine relative positions between the aircraft 100 and the mobile platform 202. In the illustrated example, the aircraft 100 includes transmitters 502 (hereinafter transmitters 502*a*, 502*b*, 502*c*, etc.) and the mobile platform 202 includes receivers 504 (hereinafter receivers 504*a*, 504*b*, 504*c*, etc.).

To determine a relative position between the aircraft 100 and the mobile platform 202, the transmitters 502*a*, 502*b*, 502*c* transmit RF signals that are received at the receivers 504*a*, 504*b*, 504*c*. In turn, signal strengths of these received RF signals are measured and/or determined. Accordingly, based on the signal strengths, the relative position is expressed in multiple degrees of freedom. Particularly, differences in position, heading, yaw and roll between the aircraft 100 and the mobile platform 202 can be calculated. In this example, the RF signals transmitted from the transmitters 502*a*, 502*b*, 502*c* include an identifier (e.g., an aircraft identifier), an antenna or transmitter identifier, and/or relative heading information. Additionally or alternatively, GPS location data, GPS time data, magnetic heading information, geolocation based on relative positioning and/or dead reckoning data are included in the RF signals. However, any other appropriate type of information can be conveyed.

While the aircraft 100 is depicted including the transmitters 502*a*, 502*b*, 502*c* while the mobile platform 202 includes the receivers 504*a*, 504*b*, 504*c*, the aircraft 100 may, instead, include the receivers 504*a*, 504*b*, 504*c* while the mobile platform 202 includes the transmitters 502*a*, 502*b*, 502*c*. Additionally or alternatively, the aircraft 100 and the mobile platform 202 can be implemented with transceivers (e.g., transceivers that arranged at identical positions on the aircraft 100 and the mobile platform 202). While the aircraft 100 and the mobile platform 202 are depicted with three of the transmitters 502*a*, 502*b*, 502*c* and three of the receivers 504*a*, 504*b*, 504*c*, respectively, any appropriate number of transmitters, receivers and/or transceivers can be implemented instead.

While an example manner of implementing the flight control system 300 of FIG. 3 is illustrated in FIG. 3, one or more of the elements, processes and/or devices illustrated in FIG. 3 may be combined, divided, re-arranged, omitted, eliminated and/or implemented in any other way. Further, the example the example flight director 304, the example position calculator 306, the example GPS signal analyzer 308, the example signal direction and distance calculator 310 and/or, more generally, the example flight control system 300 of FIG. 3 may be implemented by hardware, software, firmware and/or any combination of hardware, software and/or firmware. Thus, for example, any of the example flight director 304, the example position calculator 306, the example GPS signal analyzer 308, the example signal direction and distance calculator 310 and/or, more generally, the example flight control system 300 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example flight director 304, the example position calculator 306, the example GPS signal analyzer 308, and/or the example signal direction and distance calculator 310 is/are hereby expressly defined to include a non-transitory computer readable storage device or storage disk such as a memory, a digital versatile disk (DVD), a compact disk (CD), a Blu-ray disk, etc. including the software and/or firmware. Further still, the example flight control system 300 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
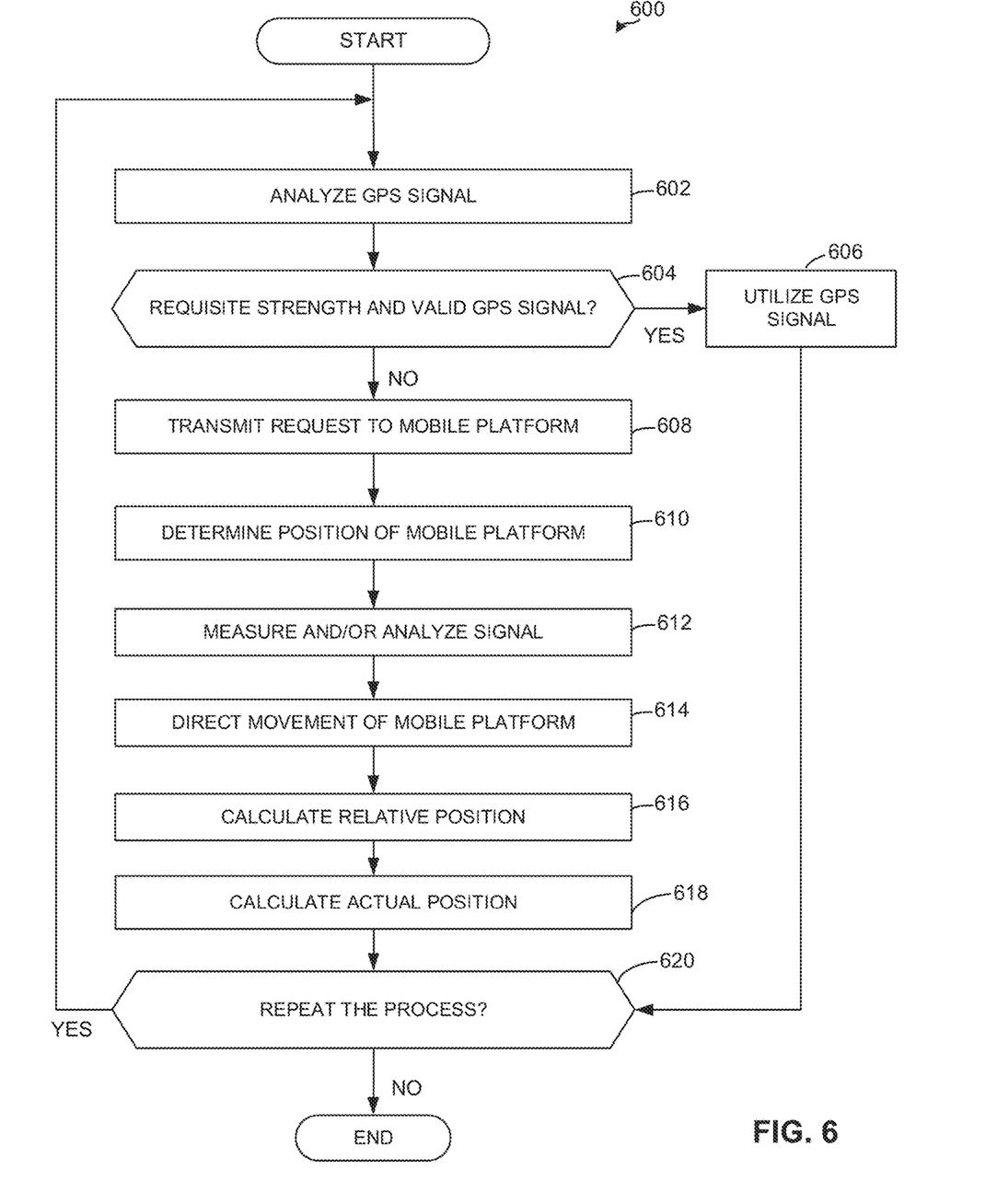
FIG. 6 is a flowchart representative of machine readable instructions which may be executed to implement the example multi-vehicle network of FIG. 2 and/or the example flight control system of FIG. 3.

A flowchart representative of example hardware logic, machine readable instructions, hardware implemented state machines, and/or any combination thereof for implementing the flight control system 300 of FIG. 3 is shown in FIG. 6. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example flight control system 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example method 600 of FIG. 6 begins as the aircraft 100 and the mobile platform 202 are being flown during a mission proximate a contested area. In this example, the aircraft 100 and the mobile platform 202 are implemented as UAVs that are identical (e.g., the aircraft 100 and the mobile platform 202 include the same or similar navigation and telemetry equipment and/or software). Further, the aircraft 100 and the mobile platform 202 are guided from a remote location (e.g., a remote command center).

At block 602, the GPS signal analyzer 308 of the illustrated example analyzes GPS signals received at the mobile platform 202 and/or the aircraft 100. In this example, the GPS signal analyzer 308 determines that the GPS signals have sufficient strength and are not compromised (e.g., spoofed, jammed, etc.).

At block 604, it is determined by the GPS analyzer 308 as to whether the detected GPS signal has the requisite signal strength and is valid. If the GPS signal strength has the requisite signal strength and is valid (block 604), control of the process proceeds to block 606 and the process proceeds to block 618. Otherwise, the process proceeds to block 608.

At block 606, the GPS signal analyzer 308 and/or the flight director 304 utilizes the GPS signal to direct movement of the aircraft 100 and/or the mobile platform 202.

At block 608, in some examples, the aircraft 100 transmits a request to the mobile platform 202 when the GPS signal is contested. The request can include a request for guidance via the mobile platform 202. For example, the jamming detector 402 can cause the aircraft 100 to request guidance and/or positional data from the mobile platform 202. In some examples, the request triggers or enables relative position determinations between the aircraft 100 and the mobile platform 202.

At block 610, a position of the mobile platform 202 is determined by the GPS signal analyzer 308. In this example, because the mobile platform 202 remains in an uncontested area, the GPS position of the mobile platform 202 is utilized by the GPS signal analyzer 308.

At block 612, in the illustrated example, at least one signal strength between the mobile platform 202 and the aircraft 100 is measured and/or analyzed by the signal direction and distance calculator 310. In this example, the signal direction and distance calculator 310 analyzes data from an antenna (e.g., direction finding antenna array, etc.) to determine a relative direction between the aircraft 100 and the mobile platform 202, and a time-of-flight signal to determine a distance between the mobile platform 202 and the aircraft 100. As a result, the distance and the relative direction at least partially define the relative direction.

At block 614, in some examples, the mobile platform 202 is moved and/or directed by the flight director 304 to move toward the aircraft 100. For example, the flight director 304 can direct the mobile platform 202 to move toward the aircraft 100 if an insufficient signal strength (e.g., for the direction finding antenna array) is measured between the mobile platform 202 and the aircraft 100.

At block 616, the position calculator 306 of the illustrated example calculates a relative position between the mobile platform 202 and the aircraft 100 based on the relative direction and the distance indicated by the time-of-flight signal. In some other examples, the relative position includes a spatial location and/or differential that is based on RF signal strengths measured between the mobile platform 202 and the aircraft 100.

At block 618, a position of the aircraft 100 is calculated based on the relative position and the position of the mobile platform 202. In this example, the position of the aircraft 100 is calculated based on a vector sum of the relative position and the position of the mobile platform 202. However, any other appropriate calculation can used instead.

At block 620, it is determined whether to repeat the process. If the process is to be repeated (block 620), control of the process returns to block 602. Otherwise, the process ends.

Figure 7:
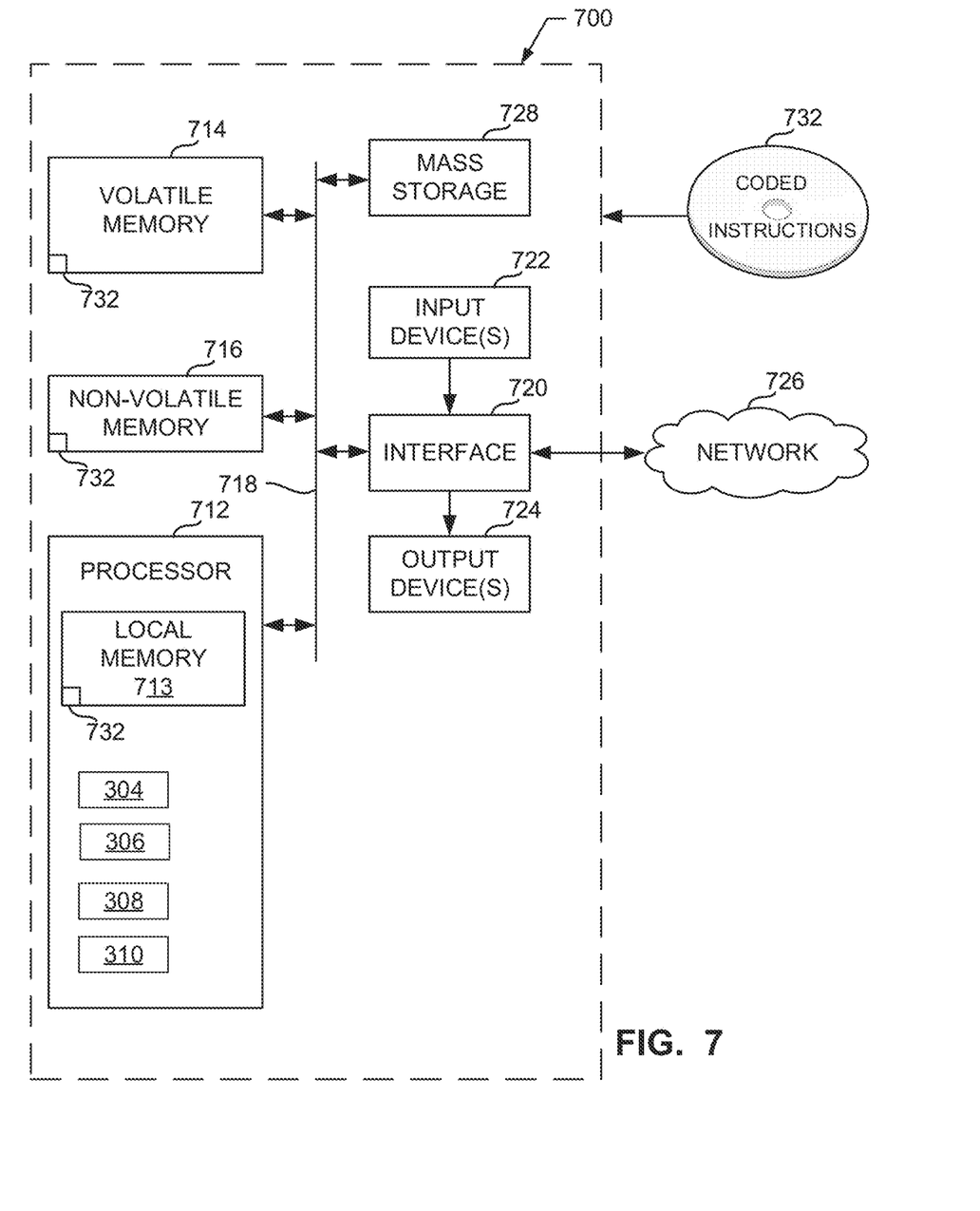
FIG. 7 is a block diagram of an example processing platform structured to execute the instructions of FIG. 6 to implement the example multi-vehicle network of FIG. 2 and/or the example flight control system of FIG. 3.

FIG. 7 is a block diagram of an example processor platform 700 structured to execute the instructions of FIG. 6 to implement the flight control system 300 of FIG. 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example flight director 304, the example position calculator 306, the example GPS signal analyzer 308, and the example signal direction and distance calculator 310.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 6 may be stored in the mass storage device 728, in the volatile memory 714, in the non-volatile memory 716, and/or on a removable non-transitory computer readable storage medium such as a CD or DVD.

Example 1 includes an apparatus to determine a position of an aircraft in a contested area. The apparatus includes a signal strength analyzer to determine a signal strength of a signal transmitted between the aircraft and a mobile platform. The apparatus further includes a position calculator to determine a relative position of the aircraft to the mobile platform based on the signal strength, and, based on the relative position and a position of the mobile platform, calculate the position of the aircraft.

Example 2 includes the apparatus as defined in example 1, further including a GPS signal analyzer to determine whether a valid GPS signal with sufficient strength is detected at the aircraft.

Example 3 includes the apparatus as defined in example 2, wherein the GPS signal analyzer is to cause the aircraft to not use a GPS signal when the GPS signal does not have sufficient strength or is not valid.

Example 4 includes the apparatus as defined in any of examples 1 to 3, wherein the aircraft and the mobile platform are unmanned aerial vehicles (UAVs).

Example 5 includes the apparatus as defined in any of examples 1 to 4, further including a flight director to direct movement of the aircraft based on the calculated position of the aircraft.

Example 6 includes the apparatus as defined in any of examples 1 to 5, wherein the relative position is based on relative direction determined via a direction finding antenna array and a time-of-flight signal.

Example 7 includes the apparatus as defined in any of examples 1 to 6, wherein the relative position is determined based on measuring signal strengths of RF signals transmitted from transmitters of one of the aircraft or the mobile platform and received at receivers of another of the aircraft or the mobile platform.

Example 8 includes an aircraft coordination system for coordinating navigation of at least one aircraft of a multi-vehicle network in a contested area. The system includes a signal direction and distance calculator to determine a relative position of the at least one aircraft to a mobile platform based on a signal transmitted between the at least one aircraft and the mobile platform, a position calculator to calculate a position of the at least one aircraft based on the relative position and a position of the mobile platform, and a flight director to direct movement of the at least one aircraft based on the position of the at least one aircraft.

Example 9 includes the system as defined in example 8, further including a GPS signal analyzer to determine whether a valid GPS signal with sufficient strength is available at the at least one aircraft.

Example 10 includes the system as defined in example 9, wherein the GPS signal analyzer is to not use a GPS signal for navigation of the at least one aircraft when the GPS signal does not have sufficient strength or is not valid.

Example 11 includes the system as defined in any of examples 8 to 10, wherein the relative position is determined based on a relative direction and a time-of-flight signal.

Example 12 includes the system as defined in any of examples 8 to 10, wherein the relative position is determined based on measuring signal strengths of RF signals transmitted from transmitters of one of the at least one aircraft or the mobile platform and received at receivers of another of the at least one aircraft or the mobile platform.

Example 13 includes a method. The method includes calculating, by executing instructions with at least one processor, a relative position between an aircraft and a mobile platform based on a signal transmitted between the aircraft and the mobile platform, and calculating, by executing instructions with the at least one processor, a position of the aircraft based on the relative position and a position of the mobile platform.

Example 14 includes the method as defined in example 13, further including analyzing, by executing instructions with the at least one processor, a validity and a strength of a GPS signal, and in response to a determination that the GPS signal is not valid or does not have sufficient strength, not using the GPS signal for navigation of the aircraft.

Example 15 includes the method as defined in any of examples 13 or 14, calculating the relative position is based on measured RF signals transmitted from transmitters of one of the aircraft or the mobile platform and received at receivers of another of the aircraft or the mobile platform.

Example 16 includes the method as defined in any of examples 13 to 15, further including directing, by executing instructions with the at least one processor, the mobile platform to move toward the aircraft based on a measured signal strength of the signal.

Example 17 includes a non-transitory machine readable medium. The non-transitory machine readable medium includes instructions, which when executed cause a processor to at least calculate a relative position between an aircraft and a mobile platform based on a signal transmitted between the aircraft and the mobile platform, and calculate a position of the aircraft based on the relative position and a position of the mobile platform.

Example 18 includes the non-transitory machine readable medium as defined in example 17, wherein the processor is further caused to analyze a validity and a strength of a GPS signal, and in response to a determination that the GPS signal is not valid or does not have sufficient strength, not using the GPS signal for navigation of the aircraft.

Example 19 includes the non-transitory machine readable medium as defined in any of examples 17 or 18, wherein the instructions further cause the processor to calculate the relative position in multiple degrees of freedom.

Example 20 includes the non-transitory machine readable medium as defined in any of examples 17 to 19, wherein the relative position is calculated based on a measured relative direction and a time-of-flight signal.

From the foregoing, it will be appreciated that example methods, apparatus and articles of manufacture have been disclosed that enable accurate and robust navigation of aircraft in contested areas. As a result, aircraft can be flown accurately even in areas where GPS signals are jammed or spoofed. Further, examples disclosed herein can enable navigation of aircraft during a GPS system failure and/or malfunction.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown in the context of aircraft, examples disclosed herein can be implemented in any other appropriate vehicle type including, but not limited to, spacecraft, watercraft, submersibles, ground-based vehicles, etc.

The following claims are hereby incorporated into this Detailed Description by this reference, with each claim standing on its own as a separate embodiment of the present disclosure.

What is claimed is:

1. An apparatus to determine a position of an aircraft in a contested area, the apparatus comprising:
   a sensor;
   machine-readable instructions; and
   programmable circuitry to at least one of execute or instantiate the machine-readable instructions to:
   determine a relative position of the aircraft with respect to a mobile platform based on signal strengths of first, second and third signals transmitted from respective first, second and third transmitters of one of the aircraft or the mobile platform to first, second and third receivers of another of the aircraft or the mobile platform;
   determine whether a global navigation satellite system (GNSS) signal is being jammed based on output of the sensor;
   calculate the position of the aircraft based on the relative position and a position of the mobile platform in response to the determination of the GNSS signal being jammed;
   guide the aircraft based on the position of the aircraft; and direct the mobile platform to move toward the aircraft based on at least one of the signal strengths not meeting or exceeding a threshold signal strength.

2. The apparatus as defined in claim 1, wherein the programmable circuitry is to at least one of execute or instantiate the machine-readable instructions to determine whether the GNSS signal is detected with sufficient strength at the aircraft.

3. The apparatus as defined in claim 2, wherein the programmable circuitry is to at least one of execute or instantiate the machine-readable instructions to cause the aircraft to not use the GNSS signal when the GNSS signal does not have sufficient strength or is not valid.

4. The apparatus as defined in claim 1, wherein the aircraft and the mobile platform are unmanned aerial vehicles (UAVs).

5. The apparatus as defined in claim 1, wherein the relative position is based on relative direction determined via a direction finding antenna array and a time-of-flight signal.

6. The apparatus as defined in claim 1, wherein the programmable circuitry is to at least one of execute or instantiate the machine-readable instructions to determine whether the GNSS signal is being spoofed, and wherein the position of the aircraft is calculated further in response to the GNSS signal being spoofed.

7. The apparatus as defined in claim 1, wherein the programmable circuitry is to at least one of execute or instantiate the machine-readable instructions to determine a malfunction of a GNSS receiver, and wherein the position of the aircraft is calculated further in response to the malfunction of the GNSS receiver.

8. The apparatus as defined in claim 1, wherein the sensor is a jamming sensor.

9. The apparatus as defined in claim 1, wherein the first, second and third transmitters are each positioned on different locations of the aircraft.

10. The apparatus as defined in claim 9, wherein the first and second transmitters are positioned on first and second wings, respectively, of the aircraft, and the third transmitter is positioned on a fuselage of the aircraft.

11. The apparatus as defined in claim 1, wherein the first, second and third receivers are each positioned on different locations of the aircraft.

12. The apparatus as defined in claim 1, wherein the first and second receivers are positioned on first and second wings, respectively, of the aircraft, and the third receiver is positioned on a fuselage of the aircraft.

13. The apparatus as defined in claim 1, wherein the programmable circuitry is to determine the relative position based on each of the first, second and third receivers receiving the first, second and third signals.

14. The apparatus as defined in claim 1, wherein the programmable circuitry is to determine a three-dimensional spatial vector based on the signal strengths.

15. An aircraft coordination system for coordinating navigation of at least one aircraft of a multi-vehicle network in a contested area, the system comprising:
   a signal analyzer to determine whether a global navigation satellite system (GNSS) signal is being jammed based on output from a jamming sensor;
   a signal direction and distance calculator to determine a relative position of the at least one aircraft with respect to a mobile platform based on signal strengths of first, second and third signals transmitted from respective first, second and third transmitters of one of the aircraft or the mobile platform to first, second and third receivers of another of the aircraft or the mobile platform in response to the determination of the GNSS signal being jammed;
   a position calculator to calculate a position of the at least one aircraft based on the relative position and a position of the mobile platform; and
   a flight director to:
      direct movement of the at least one aircraft based on the position of the at least one aircraft, and
      direct the mobile platform to move toward the aircraft based on at least one of the signal strengths not meeting or exceeding a threshold signal strength.

16. The system as defined in claim 15, further including a GPS signal analyzer to determine whether the GNSS signal is valid with sufficient strength at the at least one aircraft.

17. The system as defined in claim 16, wherein the signal analyzer is to not use the GNSS signal for navigation of the at least one aircraft when the GNSS signal does not have sufficient strength or is not valid.

18. The system as defined in claim 15, wherein the relative position is determined based on a measured relative direction and a time-of-flight signal.

19. A method comprising:
   calculating, by executing instructions with at least one processor, a relative position between an aircraft and a mobile platform based on signal strengths of first, second and third signals transmitted from respective first, second and third transmitters of one of the aircraft or the mobile platform to first, second and third receivers of another of the aircraft or the mobile platform;
   determining, by executing instructions with at least one processor, whether a global navigation satellite system (GNSS) signal is being jammed based on output from a sensor;
   calculating, by executing instructions with the at least one processor, a position of the aircraft based on the relative position and a position of the mobile platform in response to the determination of the GNSS signal being jammed;
   guiding, by executing instructions with the at least one processor, the aircraft based on the position of the aircraft; and
   directing, by executing instructions with the at least one processor, the mobile platform to move toward the aircraft based on at least one of the signal strengths not meeting or exceeding a threshold signal strength.

20. The method as defined in claim 19, further including:
   analyzing, by executing instructions with the at least one processor, a validity and a strength of the GNSS signal; and
   in response to a determination that the GNSS signal is not valid or does not have sufficient strength, not using the GNSS signal for navigation of the aircraft.

21. A non-transitory machine readable medium comprising instructions, which when executed cause a processor to at least:
   determine whether a global navigation satellite system (GNSS) signal is being jammed based on output from a sensor;
   calculate a relative position between an aircraft and a mobile platform based on signal strengths of first, second and third signals transmitted from respective first, second and third transmitters of one of the aircraft or the mobile platform to first, second and third receivers of another of the aircraft or the mobile platform in response to the determination of the GNSS signal being jammed;
calculate a position of the aircraft based on the relative position and a position of the mobile platform;
guide the aircraft based on the position of the aircraft; and
direct the mobile platform to move toward the aircraft based on at least one of the signal strengths not meeting or exceeding a threshold signal strength.

22. The non-transitory machine readable medium as defined in claim 21, wherein the processor is further caused to:
analyze a validity and a strength of the GNSS signal; and
in response to a determination that the GNSS signal is not valid or does not have sufficient strength, not using the GNSS signal for navigation of the aircraft.

23. The non-transitory machine readable medium as defined in claim 21, wherein the instructions further cause the processor to calculate the relative position in multiple degrees of freedom.

24. The non-transitory machine readable medium as defined in claim 21, wherein the relative position is calculated based on a measured relative direction and a time-of-flight signal.

* * * * *